United States Patent
Ballard et al.

(10) Patent No.: US 8,533,702 B2
(45) Date of Patent: Sep. 10, 2013

(54) DYNAMICALLY RESOLVING FIX GROUPS FOR MANAGING MULTIPLE RELEASES OF MULTIPLE PRODUCTS ON MULTIPLE SYSTEMS

(75) Inventors: Barbara A. Ballard, Mantorville, MN (US); George F. DeStefano, Rochester, MN (US); Ronald J. Haugen, Rochester, MN (US); Gregory R. Hintermeister, Rochester, MN (US); Brian R. Lucier, Rochester, MN (US); Diane E. Olson, Rochester, MN (US); Ellen B. Streifel, Rochester, MN (US); Gary John Vanselow, Rochester, MN (US); Jeffrey D. Waldbillig, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2713 days.

(21) Appl. No.: 10/185,332

(22) Filed: Jun. 27, 2002

(65) Prior Publication Data
US 2004/0003387 A1    Jan. 1, 2004

(51) Int. Cl.
*G06F 9/44*    (2006.01)

(52) U.S. Cl.
USPC .......................................... 717/169; 717/170

(58) Field of Classification Search
USPC ................................................. 717/168–178
See application file for complete search history.

(56) References Cited

U.S. PATENT DOCUMENTS

| | | | | |
|---|---|---|---|---|
| 5,909,581 | A * | 6/1999 | Park | 717/170 |
| 6,151,643 | A * | 11/2000 | Cheng et al. | 710/36 |
| 6,199,204 | B1 * | 3/2001 | Donohue | 717/178 |
| 6,202,207 | B1 * | 3/2001 | Donohue | 717/173 |
| 6,282,709 | B1 * | 8/2001 | Reha et al. | 717/175 |
| 6,381,742 | B2 * | 4/2002 | Forbes et al. | 717/176 |
| 6,425,126 | B1 * | 7/2002 | Branson et al. | 717/168 |
| 6,493,871 | B1 * | 12/2002 | McGuire et al. | 717/173 |
| 6,744,450 | B1 * | 6/2004 | Zimniewicz et al. | 715/841 |
| 6,804,663 | B1 * | 10/2004 | Delo | 707/3 |
| 7,530,065 | B1 * | 5/2009 | Ciudad et al. | 717/174 |
| 2002/0059446 | A1 * | 5/2002 | Visalli et al. | 709/236 |
| 2004/0181790 | A1 * | 9/2004 | Herrick | 717/168 |
| 2005/0132350 | A1 * | 6/2005 | Markley et al. | 717/168 |
| 2007/0113225 | A1 * | 5/2007 | Felts | 717/172 |

* cited by examiner

*Primary Examiner* — Jason Mitchell
(74) *Attorney, Agent, or Firm* — Patterson & Sheridan LLP

(57) ABSTRACT

The present invention generally is directed to a method, system and article of manufacture for managing software fixes for a software product in a computer system. The method comprises: for each of a plurality of software fixes for a corresponding software product, determining whether the corresponding software product is installed on the computer system; if the corresponding software product is installed, then determining whether the each one of the plurality of software fixes is installed in the computer system; and if the each one of the plurality of software fixes is installed, then setting a status value to reflect that the plurality of software fixes is installed.

25 Claims, 16 Drawing Sheets

124 → Software product inventory

| | | 502 | 504 | 506 |
|---|---|---|---|---|
| | s/w Prod 1 | 0.9.0 | Installed | |
| | s/w Prod 2 | 2.0.0 | Installed | |
| | s/w Prod 3 | 2.1.0 | Supported | |

126 → Software fix inventory

| | | 510 | 512 | 514 | 516 |
|---|---|---|---|---|---|
| Fix_ID_1 | s/w Prod 1 | 0.9.0 | Installed | | |
| Fix_ID_2 | s/w Prod 1 | 0.9.0 | Installed | | |
| Fix_ID_3 | s/w Prod 2 | 2.0.0 | Installed | | |
| Fix_ID_12 | s/w Prod 3 | 2.1.0 | Available | | |

FIG. 5

Expanded fix list for "Fix_Grp_A"                                    Expanded list status
                                                                              ↙ 800

| Fix_ID_1  | s/w Prod 1 | 0.9.0 | Installed                          |
| Fix_ID_2  | s/w Prod 1 | 0.9.0 | Installed                          |
| Fix_ID_3  | s/w Prod 2 | 2.0.0 | Installed                          |
| Fix_ID_11 | s/w Prod 2 | 2.1.1 | not applicable                     |
| Fix_ID_12 | s/w Prod 3 | 2.1.0 | Supported                          |
| Fix_ID_21 | s/w Prod 2 | 2.0.0 | Not Installed (not in fix inventory) |
| Fix_ID_22 | s/w Prod 3 | 2.1.0 | Supported                          |
| Fix_ID_31 | s/w Prod 4 | 4.4.0 | not applicable                     |

FIG. 8A

Fix group inventory
                                ↙ 900

| Name      | Level | Status        |
|-----------|-------|---------------|
| Fix_Grp_A | 11    | Not Installed |
| Fix_Grp_X | 88    | Not Installed |
| Fix_Grp_Y | 44    | Installed     |

FIG. 8B

| Fix Group | Level | Status | Description |
|---|---|---|---|
| Fix_grp_a | 11 | Not installed | My fix group |
| Fix_grp_X | 88 | Not installed | A related fix group |
| Fix_grp_Y | 44 | Installed | Another related fix group |

Fix_grp_aProperties

| General | Fixes and Groups |

Fixes

| Fix | Product | Release | Status |
|---|---|---|---|
| ⊞ Fixid01 | Swprod1 | v0f9m0 | Installed |
| ⊞ Fixid02 | Swprod1 | v0f9m0 | Installed |
| ⊞ Fixid03 | Swprod2 | v2f0m0 | Installed |
| ⊞ Fixid11 | Swprod2 | v2f1m1 | Not applicable |

Properties

Fix groups

| Fix Group | Level | Status | Description |
|---|---|---|---|
| ⊞ Fix_grp_X | 88 | Not installed | A related fix group |

Properties

OK    Cancel    Help

~1000

DYNAMICALLY RESOLVING FIX GROUPS FOR MANAGING MULTIPLE RELEASES OF MULTIPLE PRODUCTS ON MULTIPLE SYSTEMS

BACKGROUND OF THE INVENTION

1. Field of the Invention

The present invention generally relates to software fixes for software products, and more specifically, for managing software fixes in a computer system.

2. Description of the Related Art

As computers have become ubiquitous, so has the software that is needed to run them. Further, the pace of additions, modifications, and changes to software has quickened dramatically. Until recently, a new release of a software product was generated about two or three years after the previous release. Today, a new release may be generated in less than a year from the previous release. Furthermore, because of the complexity of software, as soon as the software product is released, errors (commonly called "bugs") are found. These errors are generally attended to immediately by the software product's programmers, who find a "fix" or "patch" for the program. These fixes or patches are usually distributed to registered owners of the software product, or placed on an Internet website where the software product owner can download the fix.

Each software product has its own set of fixes. Thus, if a system has multiple software products, the system will require multiple sets of fixes. The registered owner or a system administrator, therefore, is required to download each individual fix for each software product one at a time, which can be time-consuming and tedious.

Moreover, multiple sets of fixes can be organized into a group of fixes that generally represents a specific maintenance level or functional level. The groups of fixes are routinely provided today as the mechanism for delivering the maintenance levels in fix releases of the software product or in service packs. The problem with the current mechanism, however, is that the production of fix releases and service packs require rebuilding, reverifying, re-releasing and reinstalling the entire product or service pack. Also, it is difficult to transmit the maintenance level or functional level implemented as a fix release or service pack without transmitting the entire implementation. As a result, all fixes in the service pack are sent to every target system as one bundle regardless of whether the target system needs all of the fixes.

Furthermore, if the owner or the system administrator desires to determine the status of each fix in the system, they would have to search for and determine each fix individually, which makes a simple determination of a status for set of fixes for multiple software products a tedious and long process.

A need therefore exists for a method and apparatus for managing software fixes in computer systems.

SUMMARY OF THE INVENTION

The present invention generally is directed to a method, system and article of manufacture for managing software fixes for a software product in a computer system. The method comprises: for each of a plurality of software fixes for a corresponding software product, determining whether the corresponding software product is installed on the computer system; if the corresponding software product is installed, then determining whether the each one of the plurality of software fixes is installed in the computer system; and if the each one of the plurality of software fixes is installed, then setting a status value to reflect that the plurality of software fixes is installed.

In another embodiment, the invention is directed to a method of sending a data structure identifying a plurality of software fixes from a computer system. The method comprises: receiving a request to send the data structure; if the plurality of software fixes has a related plurality of software fixes, then retrieving a data structure identifying the related plurality of software fixes; and sending the data structure identifying the plurality of software fixes and the data structure identifying the related plurality of software fixes.

In yet another embodiment, the invention is directed to a method of processing a data structure identifying a plurality of software fixes. The method comprises: receiving the data structure from a first computer; storing the data structure in a second computer; using information provided by the data structure, retrieving, by the second computer, the plurality of software fixes from the first computer; and installing the plurality of software fixes into the second computer.

In still another embodiment, the invention is directed to a computer readable medium containing a program for managing software fixes for a software product in a computer system. The operation comprises: for each of a plurality of software fixes for a corresponding software product, determining whether the corresponding software product is installed on the computer system; if the corresponding software product is installed, then determining whether the each one of the plurality of software fixes is installed in the computer system; and if the each one of the plurality of software fixes is installed, then setting a status value to reflect that the plurality of software fixes is installed.

In yet still another embodiment, the invention is directed to computer readable medium containing a program for sending a data structure identifying a plurality of software fixes from a computer system. The operation comprises: receiving a request to send the data structure; if the plurality of software fixes has a related plurality of software fixes, then retrieving a data structure identifying the related plurality of software fixes; and sending the data structure identifying the plurality of software fixes and the data structure identifying the related plurality of software fixes.

In another embodiment, the invention is directed to a computer readable medium containing a program for processing a data structure identifying a plurality of software fixes. The operation comprises: receiving the data structure from a first computer; storing the data structure in a second computer; using information provided by the data structure, retrieving, by the second computer, the plurality of software fixes from the first computer; and installing the plurality of software fixes into the second computer.

In yet another embodiment, the invention is directed to data structure stored in a memory, the data structure comprising: a plurality of records identifying a plurality of software fixes for a plurality of software products, each record comprising a software product identifier, a software fix identifier and a software product release identifier; and a reference to a plurality of records identifying a related plurality of software fixes.

In still yet another embodiment, the invention is directed to a computer system, comprising: a memory containing a program for managing software fixes for a software product in a computer system; and a processor which, when executing the program, performs an operation. The operation comprises: for each of a plurality of software fixes for a corresponding software product, determining whether the corresponding software product is installed on the computer system; if the corresponding software product is installed, then determining whether the each one of the plurality of software fixes is installed in the computer system; and if the each one of the plurality of software fixes is installed, then setting a status value to reflect that the plurality of software fixes is installed.

In still another embodiment, the invention is directed a computer system, comprising: a memory containing a program for sending a data structure identifying a plurality of software fixes from a computer system; and a processor which, when executing the program, performs an operation. The operation comprises: receiving a request to send the data structure; if the plurality of software fixes has a related plurality of software fixes, then retrieving a data structure identifying the related plurality of software fixes; and sending the data structure identifying the plurality of software fixes and the data structure identifying the related plurality of software fixes.

In still another embodiment, the invention is directed a computer system, comprising: a memory containing a program for processing a data structure identifying a plurality of software fixes; and a processor which, when executing the program, performs an operation. The operation comprises: receiving the data structure from a first computer; storing the data structure in a second computer; using information provided by the data structure, retrieving, by the second computer, the plurality of software fixes from the first computer; and installing the plurality of software fixes into the second computer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 illustrates a software product inventory and a software fix inventory in accordance with an embodiment of the invention;

FIG. 8A illustrates an expanded fix list in accordance with an embodiment of the invention;

FIG. 8B illustrates a fix group inventory in accordance with an embodiment of the invention;

FIG. 9 illustrates a graphical user interface in accordance with an embodiment of the invention;

FIG. 10 illustrates another graphical user interface in accordance with an embodiment of the invention;

DETAILED DESCRIPTION OF THE PREFERRED EMBODIMENTS

Figure 1:
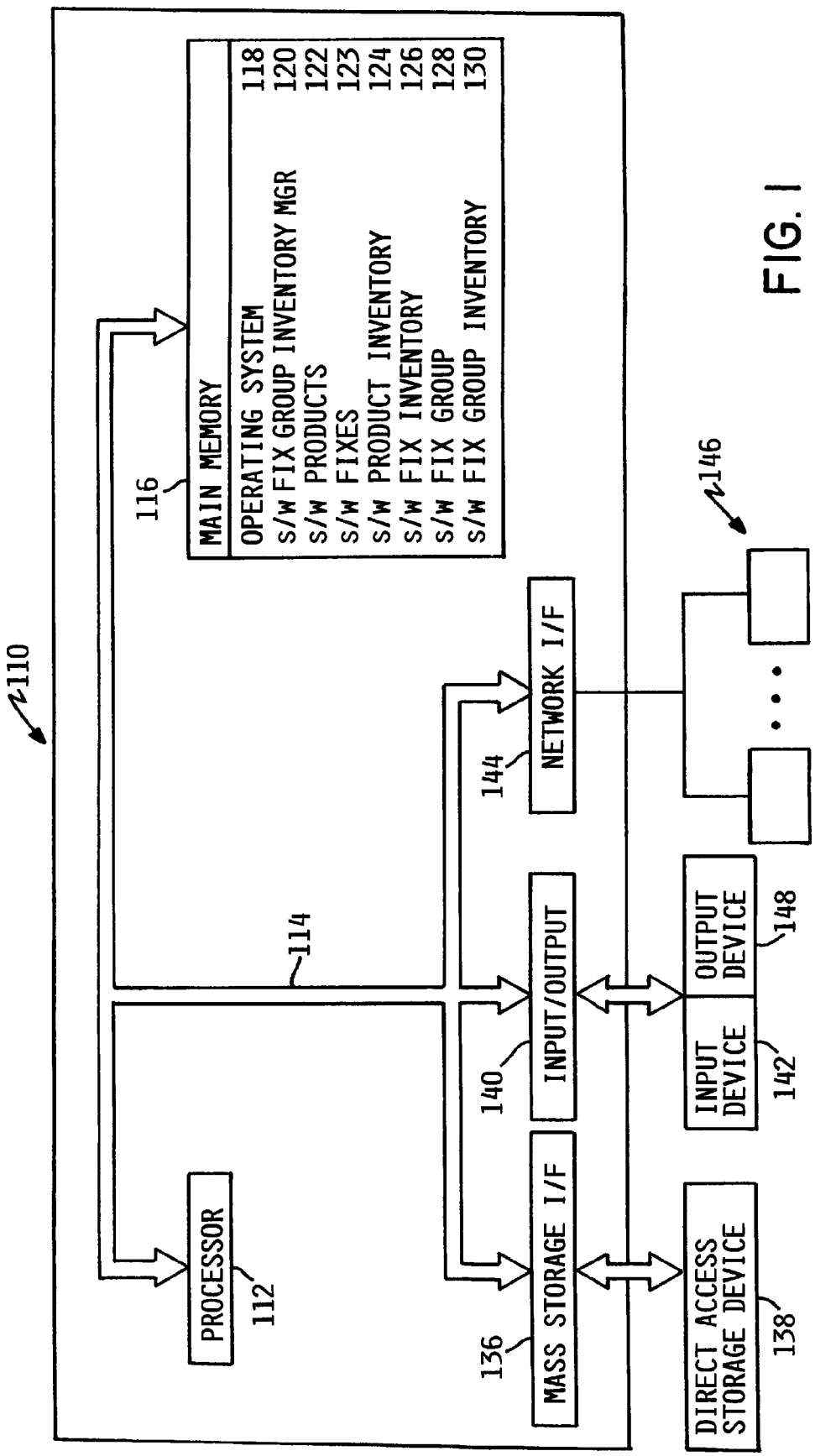
FIG. 1 is a computer system in accordance with an embodiment of the invention.

Before proceeding to detailed discussions of the embodiments of the current invention, it is beneficial to discuss terminology that is used herein. However, it is understood that the terminology and definitions used herein are merely illustrative and other suitable terminology may be used. A "software product" is generally considered a release of software for a computer system. A software product could be an operating system, financial software, office software, an internet browser, text-editing software, a child's game, etc. In addition, a software product could be drivers for printers, video cards, sound cards, etc. A "release" of a software product is intended to be complete. Releases generally have new version numbers that have years or whole numbers associated with them, such as Version 97 or Version 2.0. A "software fix" is generally considered a permanent or temporary change or addition to the software product. General terms for these types of software fixes include an "update" or a "patch", for example. Updates are usually permanent fixes for software products and typically include minor changes to the software product, while patches are usually temporary pieces of software that fix one or more problems. A more permanent fix for the problem usually follows the patch. Software fixes therefore are tied to releases of software products: one software fix is made for a particular release of a software product.

A "fix record" is a term generally used to indicate a particular software fix for a software product at a particular release, while a "product record" is generally used to indicate a software product at a particular release. Some manufacturers use dates to describe the product record and the fix record. These concepts will be more apparent in later discussions. Furthermore, other manufacturers use numbers and letters for the product record and fix record. Additionally, some manufacturers also add "build levels" or additional identifying indicia. In short, a product record is generally any indicia used to track the software product, and a fix record is generally any indicia used to track software fixes added to the product.

The present invention is generally directed to managing software fixes in a computer. Each fix is designed to "fix" or update a particular software product installed in the computer. Some software products, however, may require more than one fix. Furthermore, more than one product may be installed in the computer. To assist in the management of the plurality of fixes for a given computer, the plurality of fixes may each be identified in a fix group structure (such as a list) storable on a storage medium and accessible by a computer. For convenience, such as structure is identified herein as a "fix group". Accordingly, a fix group identifies at least one particular fix for at least one particular product. More advantageously, the fix group identifies a plurality of fixes for each of a plurality of products. In one aspect, the fix group may be used to provide an indication of the status of the fix or fixes which are identified by the fix group. In particular, the fix group is assigned a status value which is determined by the status of the individual fixes identified by the fix group. For instance, if all fixes identified in the fix group and the corresponding product(s) of the fixes are installed on the computer, then the status of the fix group will be set to INSTALLED (or some other value carrying the same meaning). Another instance would be that if all the fixes identified in the fix group and the corresponding product(s) of the fixes are not installed on the computer, then the status of the fix group will be set to NOT INSTALLED (or some other value carrying the same meaning). The status of the fix group is, therefore, generally determined by each fix stored in the computer and each product installed in the computer. In this manner, the provision of such a fix group facilitates management of software fixes in the computer system.

The fix group may also be sent from one computer to another. Upon receipt of the fix group, the receiving computer can use the information provided in the fix group to retrieve only the fixes that it needs. Since the fix group does not contain the actual fixes themselves, the time it takes to send the fix group from one computer to another may be dramatically reduced. The process for managing the fixes using the concept of a fix group will be discussed in more detail in the following paragraphs.

Referring now to FIG. 1, a computing environment 100 consistent with the invention is shown. The environment 100 may include a computer 110. For purposes of the invention, the computer 110 may represent any type of computer, computer system or other programmable electronic device, including a client computer, a server computer, a portable computer, an embedded controller, etc. The computer 110 may be a standalone device or networked into a larger system. In one embodiment, the computer 110 is an eServer iSeries computer available from International Business Machines of Armonk, N.Y.

The computer 110 generally includes at least one processor 112, which obtains instructions and data via a bus 114 from a main memory 116. The computer 110 can be connected to a number of operators and peripheral systems. Illustratively, the computer 110 includes a storage device 138, input devices 142, output devices 148, and a plurality of networked devices 146. Each of the peripheral systems is operably connected to the computer 110 via interfaces 136, 140 and 144. In one embodiment, the storage device 138 is DASD (Direct Access Storage Device), although it could be any other storage such as floppy disc drives or optical storage. Even though the storage device 138 is shown as a single unit, it could be any combination of fixed and/or removable storage devices, such as fixed disc drives, floppy disc drives, tape drives, removable memory cards, or optical storage. The input devices 142 can be any device to give input to the computer 110. For example, a keyboard, keypad, light pen, touch screen, button, mouse, track ball, or speech recognition unit could be used. The output devices 148 include any conventional display screen and, although shown separately from the input devices 142, the output devices 148 and the input devices 142 could be combined. For example, a display screen with an integrated touch screen, and a display with an integrated keyboard, or a speech recognition unit combined with a text speech converter could be used.

The main memory 116 can be one or a combination of memory devices, including Random Access Memory, non-volatile or backup memory, (e.g., programmable or Flash memories, read-only memories, etc.). In addition, the main memory 116 may be considered to include memory physically located elsewhere in a computer 110, for example, any storage capacity used as virtual memory or stored on a mass storage device or on another computer coupled to the computer 110 via the bus 114. While the main memory 116 is shown as a single entity, it should be understood that main memory 116 may in fact comprise a plurality of modules, and that the main memory 116 may exist at multiple levels, from high speed registers and caches to lower speed but larger DRAM chips.

In one embodiment, the main memory 116 includes an operating system 118, a software fix group inventory manager 120, and various data structures, such as software products 122, software fixes 123, a software product inventory 124, a software fix inventory 126, a software fix group 128 and a software fix group inventory 130.

The operating system 118 is the software used for managing the operation of the computer 110. Examples of the operating system 118 include IBM OS/400, UNIX, Microsoft Windows, and the like.

The software fix group inventory manager 120 is a computer program configured to manage the fix groups of a system, such as, determining all the software fix groups in a system, the status of each fix group, the particular fixes listed within each fix group. The fix group inventory manager 120 may be a separate software component of the computer 110. Alternatively, the fix group inventory manager 120 may be a sub-component of the operating system 118 or any other software product executing on the computer 110.

The software products 122 are representative of all the software products installed in the computer 110. As previously discussed, the software products 122 may include any type of complete software product, such as an operating system component, a driver, dynamic link libraries, programs, and files. The software fixes 123 are generally configured to provide temporary or permanent fixes to the software products 122.

The software product inventory 124 is generally an inventory of all the software products installed on the computer 110. The software fix inventory 126 is generally an inventory of all the fixes installed in the computer 110. The fix group 128 contains information defined for the purpose for managing the fixes identified by the fix records. The software fix group inventory 130 is an inventory of all the fix groups in the computer 110.

Figure 2:
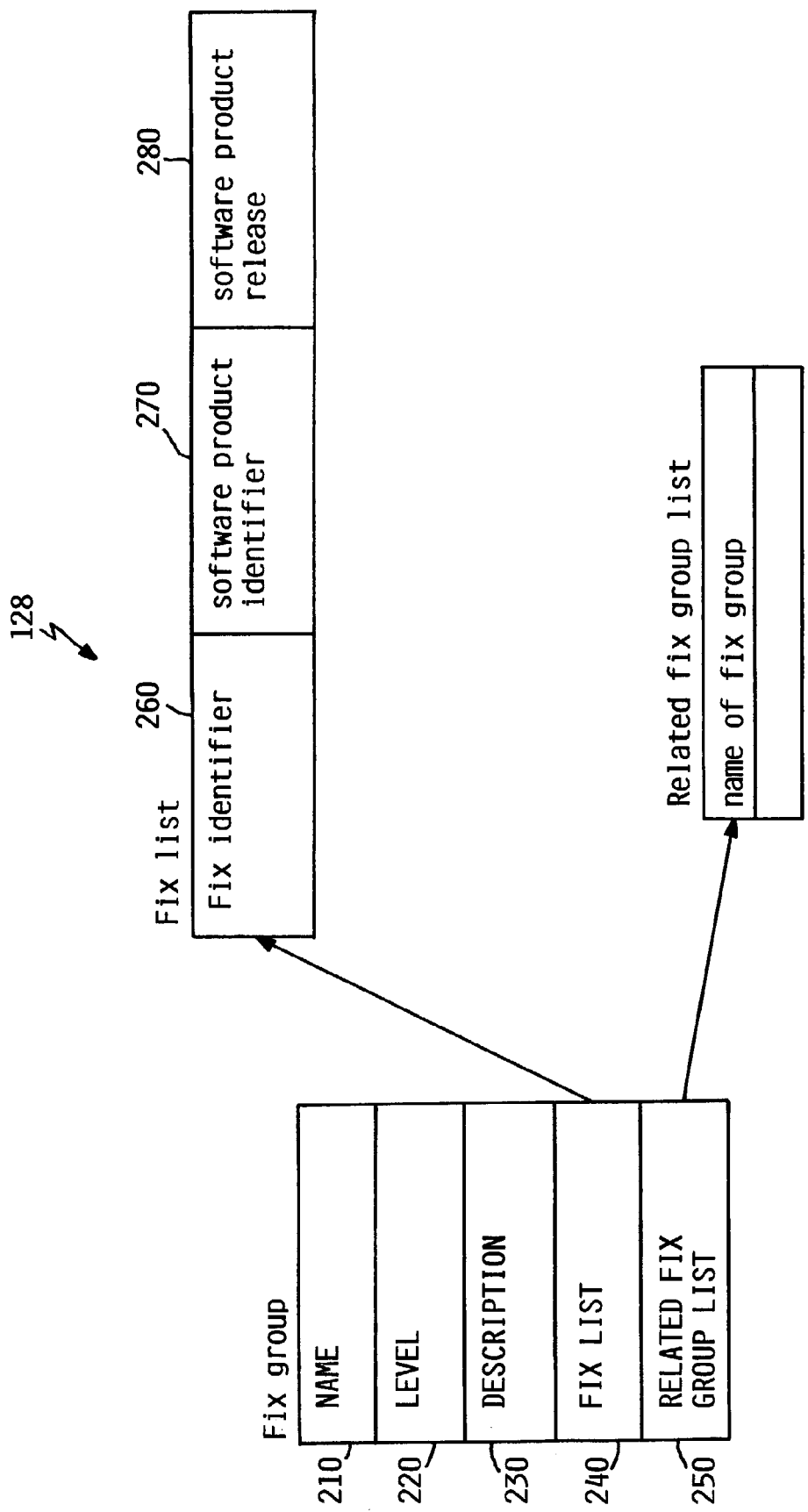
FIG. 2 is a block diagram of a software fix group in accordance with an embodiment of the present invention.

FIG. 2 shows a block diagram of the software fix group 128 in accordance with an embodiment of the present invention is shown. The software fix group 128 comprises a fix group name 210, a fix group level 220, a fix group description 230, a fix group fix list 240 and a related fix group fix list 250. The fix group name 210 identifies the fix group 128 by a name. The fix group level 220 indicates the level of the fix group 128. Different fix group levels may correlate to different fix groups defining different fixes. A higher (or newer) level may also be indicative of a more recent fix group. In one embodiment, the fix group level 220 changes when either the content of the fix group fix list 240 or the content of the related fix group list 250 changes. The fix group description 230 describes what the fix group 128 is configured to do. The related fix group fix list 250 refers by name to a fix list of another fix group that is related to the fix group 128. Each related fix group may have its own name, level, description, fix list and its own related fix group. The related fix group list 250 may also include the most current level.

The fix group fix list 240 comprises a list of fix records, each being identified by a fix identifier 260, a software product identifier 270 and a software product release 280. The fix identifier 260 is a unique identifier that identifies a particular software fix. In one embodiment, the fix identifier 260 is a number, but it could be any indicia that uniquely identifies one particular software fix. In one embodiment, a fix identifier for a more recent fix is higher than that for a less recent fix. The software product release 280 indicates the version or release of the software product. In accordance with an embodiment, the fix group fix list 240 merely comprises a list of fix records without the actual fixes (programs) themselves. The related fix group list 250 may also include merely a list of fix groups without the actual fix groups themselves. In one embodiment, the fix group 128 has at least one fix record listed in the fix group fix list 240. In a different embodiment, the fix group 128 has at least one related fix group list 250. The fix group 128 may also contain various fix records for various releases of various software products.

Figure 3:
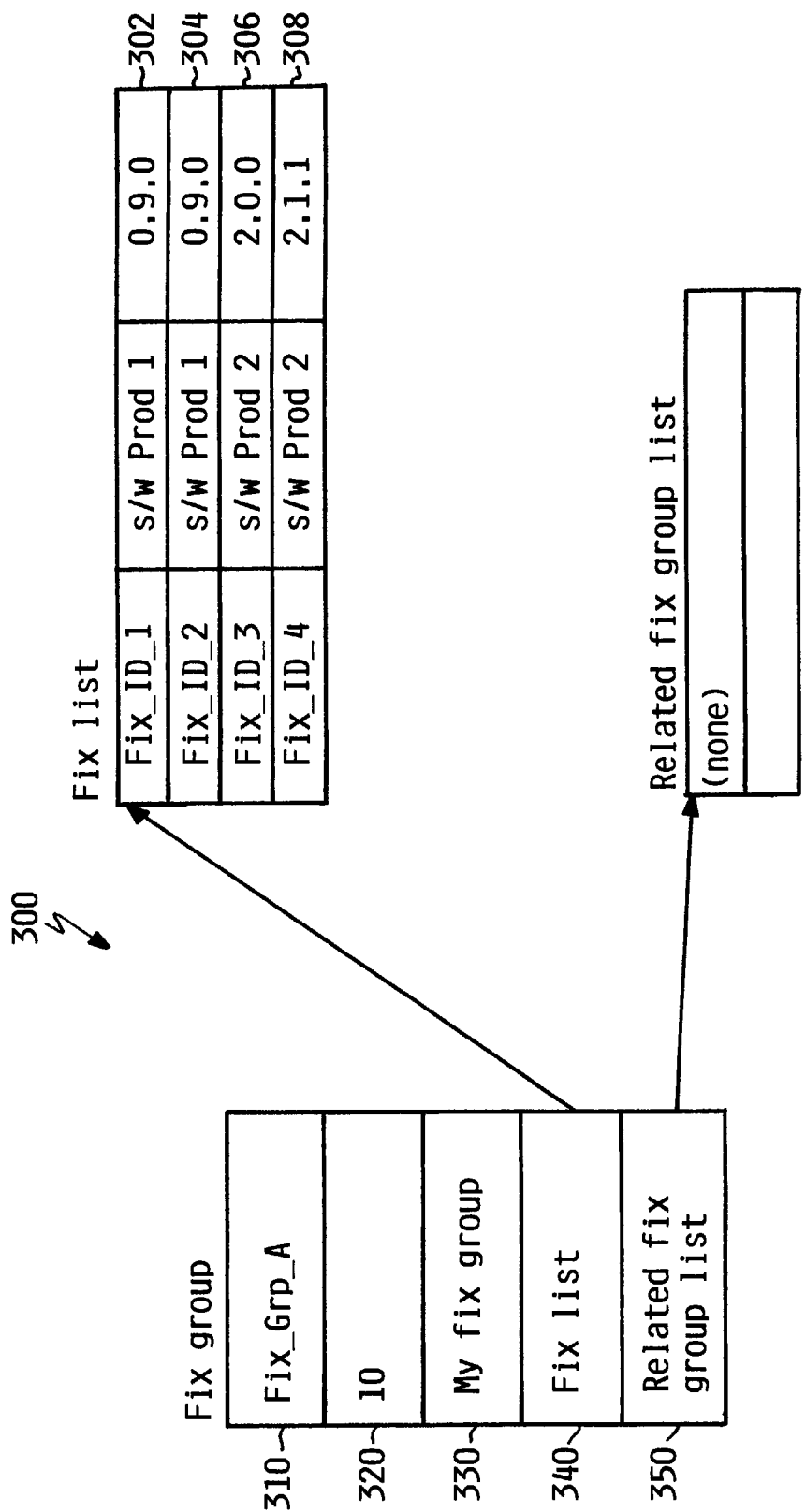
FIG. 3 illustrates an example of a fix group in accordance with an embodiment of the present invention.

Referring now to FIG. 3, an example of the fix group 128, referred to as fix group 300, is shown. The fix group name 310 of fix group 300 is Fix_Grp_A. The fix group level 320 is 10. The fix group description 330 is "My fix group." The fix group fix list 340 contains four fix records 302-308. Fix record 302 has a fix identifier of Fix_ID_1, a software product identifier of Prod 1 and a software product release of 9.0. Fix record 304 has a fix identifier of Fix_ID_2, a software product identifier of Prod 1 and a software product release of 9.0. Fix record 304 indicates a second fix for the same release of Prod 1. Fix record 306 has a fix identifier of Fix_ID_3, a software product identifier of Prod 2 and a software product release of 2.0. Fix record 308 has a fix identifier of Fix_ID_4, a software product identifier of Prod 2 and a software product release of 2.1.1, which indicates a different fix for a different release of Prod 2. Fix group 300 comprises no related fix group list.

Figure 4:
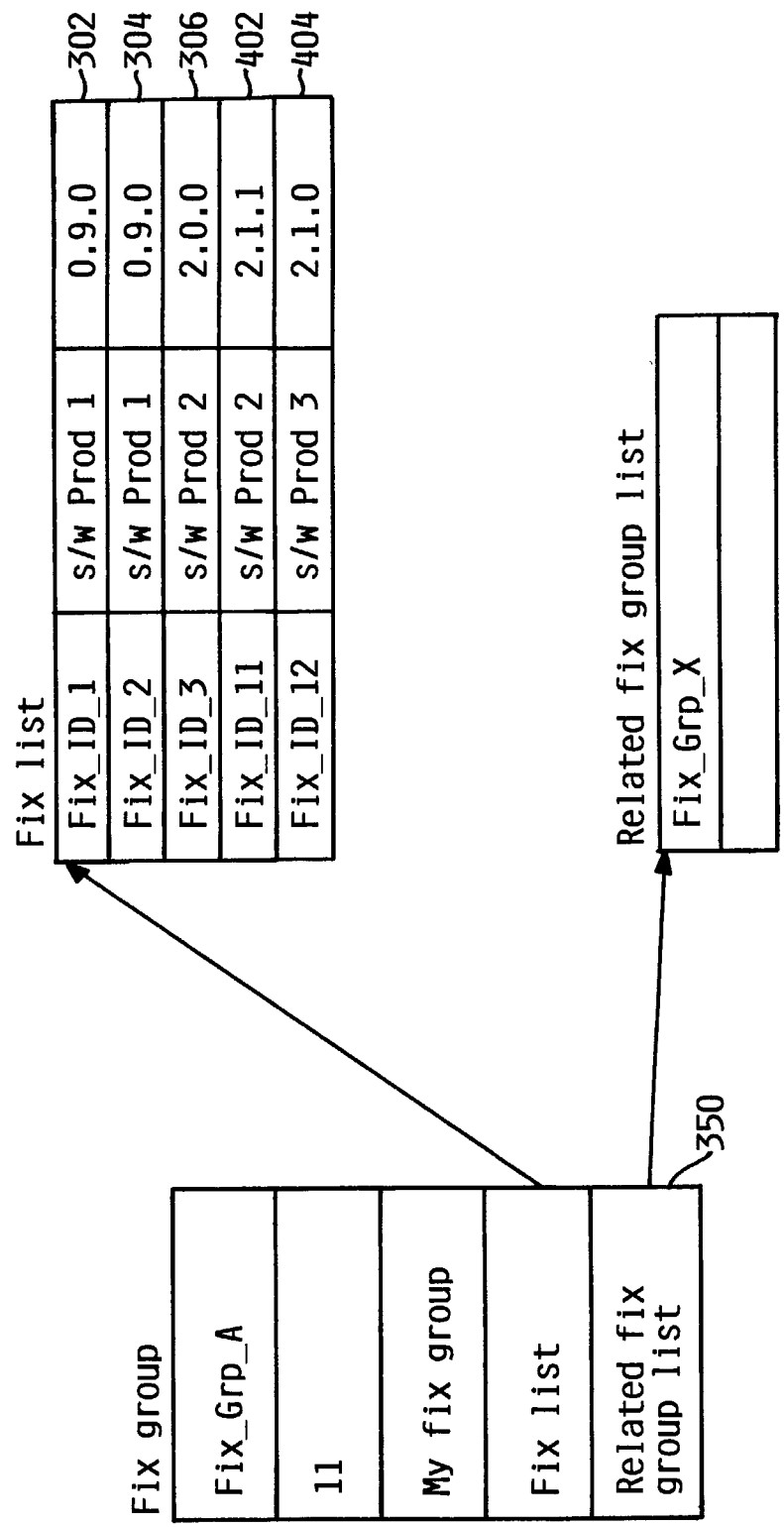
FIG. 4 illustrates another example of a fix group in accordance with an embodiment of the present invention.

FIG. 4 illustrates a block diagram of the fix group 300 as a result of some changes in the content. As shown in FIG. 4, the fix group fix list 340 now contains five fix records 302, 304, 306, 402 and 404. More specifically, fix record 308 has been removed from the fix group list 340 and fix records 402 and 404 have been added to the fix group list 340. Fix record 402 comprises a fix identifier of Fix_ID_11, a software product identifier of Prod 2 and a software product release of 2.1.1, which indicates a different fix for the same release as the former fix identified in fix record 308. Fix record 404 comprises a fix identifier of Fix_ID_12, a software product identifier of Prod 3 and a software product release of 2.1.0. Related fix group fix list 350 with the name Fix_Grp_X has also been added to fix group 300. The fix group level 220 has also been changed to 11 as a result of the different set of fix records. In one embodiment, the level 11 indicates that fix group 300 contains a more recent set of fixes. In another embodiment, all the fix records of fix group 300 at level 11 is displayed on a graphical user interface, such as the graphical user interface 1000 shown in FIG. 10.

FIG. 5 illustrates an example of the software product inventory 124 and the software fix inventory 126, which will be used in determining the status of the fix group 300 in accordance with an embodiment of the invention. In one embodiment, each computer system has its own software product inventory and software fix inventory.

In accordance with an embodiment of the invention, the software product inventory 124 comprises a plurality of product records 502-506, which indicate the status for all the software products that reside in the computer 110. Product record 502 comprises a software product identifier Prod 1, a software product release of 9.0 and a product status of "Installed." Product record 504 comprises a software product identifier Prod 2, a software product release of 2.0.0 and a product status of "Installed." Product record 506 comprises a software product identifier Prod 3, a software product release of 2.1.0 and a product status of "Supported." The status "supported" generally indicates (for instance, to the fix group inventory manager 120) that even though the software product itself is not installed in the computer system, it is desirable that the fix for that software product be stored in the computer system. In one embodiment, which will be explained later, the fix can be retrieved by other systems for their own use. In another embodiment, the fix can be stored in a container or file of the computer system. In yet another embodiment, the absence of a software product or release in the software product inventory 124 implies that the software product is not installed the computer 110.

The software fix inventory 126 comprises of a plurality of fix records 510-516, which indicate the status for all the fixes that are stored in the computer 110. Fix record 510 comprises a fix identifier Fix_ID_1, a software product identifier Prod 1, a software product release 9.0, and a software fix status "Installed." Fix record 512 comprises a fix identifier Fix_ID_2, a software product identifier Prod 1, a software product release 9.0, and a software fix status "Installed." Fix record 514 comprises a fix identifier Fix_ID_3, a software product identifier Prod 2, a software product release 2.0.0, and a software fix status "Installed." Fix record 516 comprises a fix identifier Fix_ID_12, a software product identifier Prod 3, a software product release 2.1.0, and a software fix status "Available." In accordance with one embodiment of the invention, the absence of a software fix in the software fix inventory 126 implies that the software fix is not installed the computer 110.

Figure 6A:
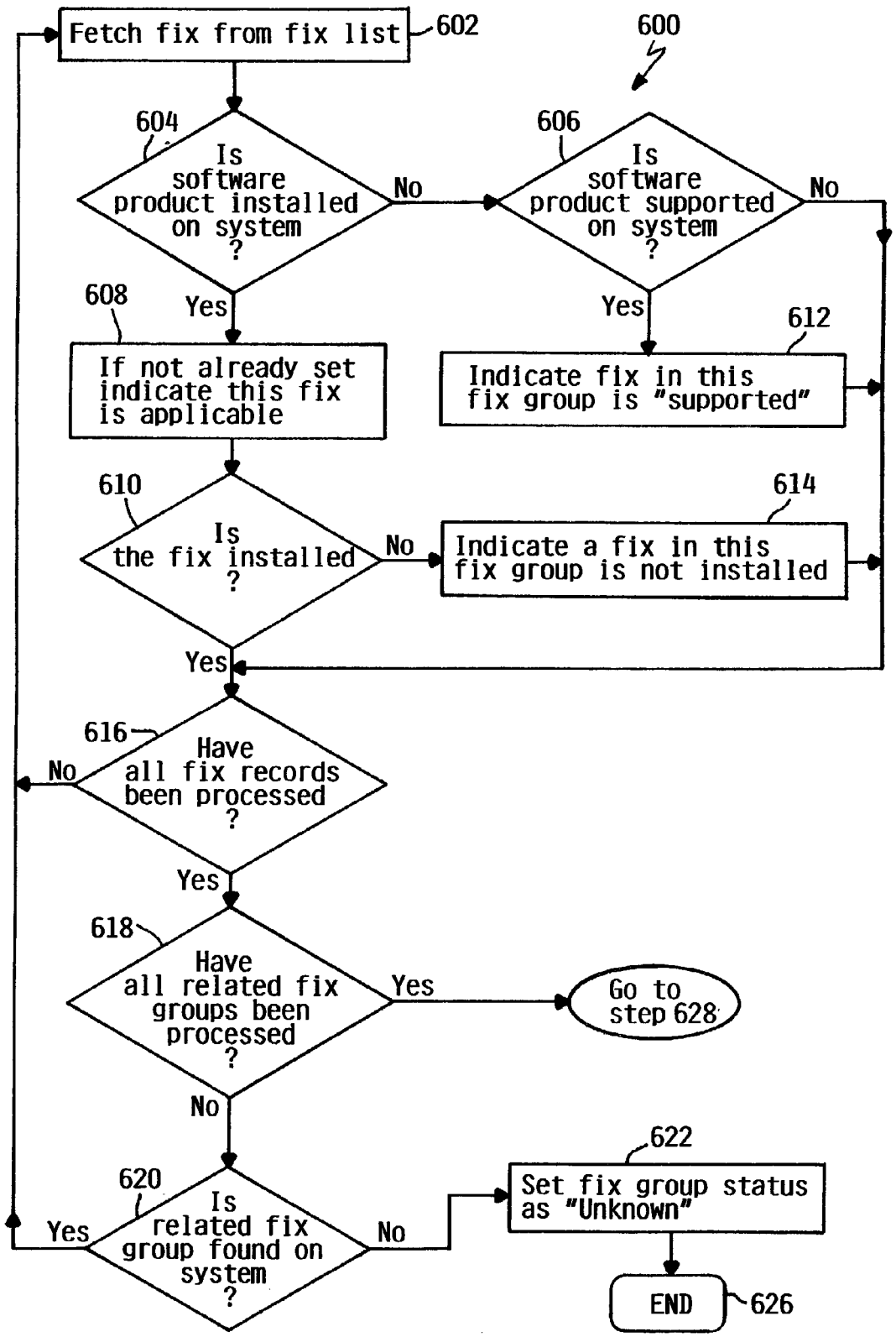
FIGS. 6A and 6B illustrate a process of determining the status of a fix group in accordance with an embodiment of the present invention.
Figure 6B:
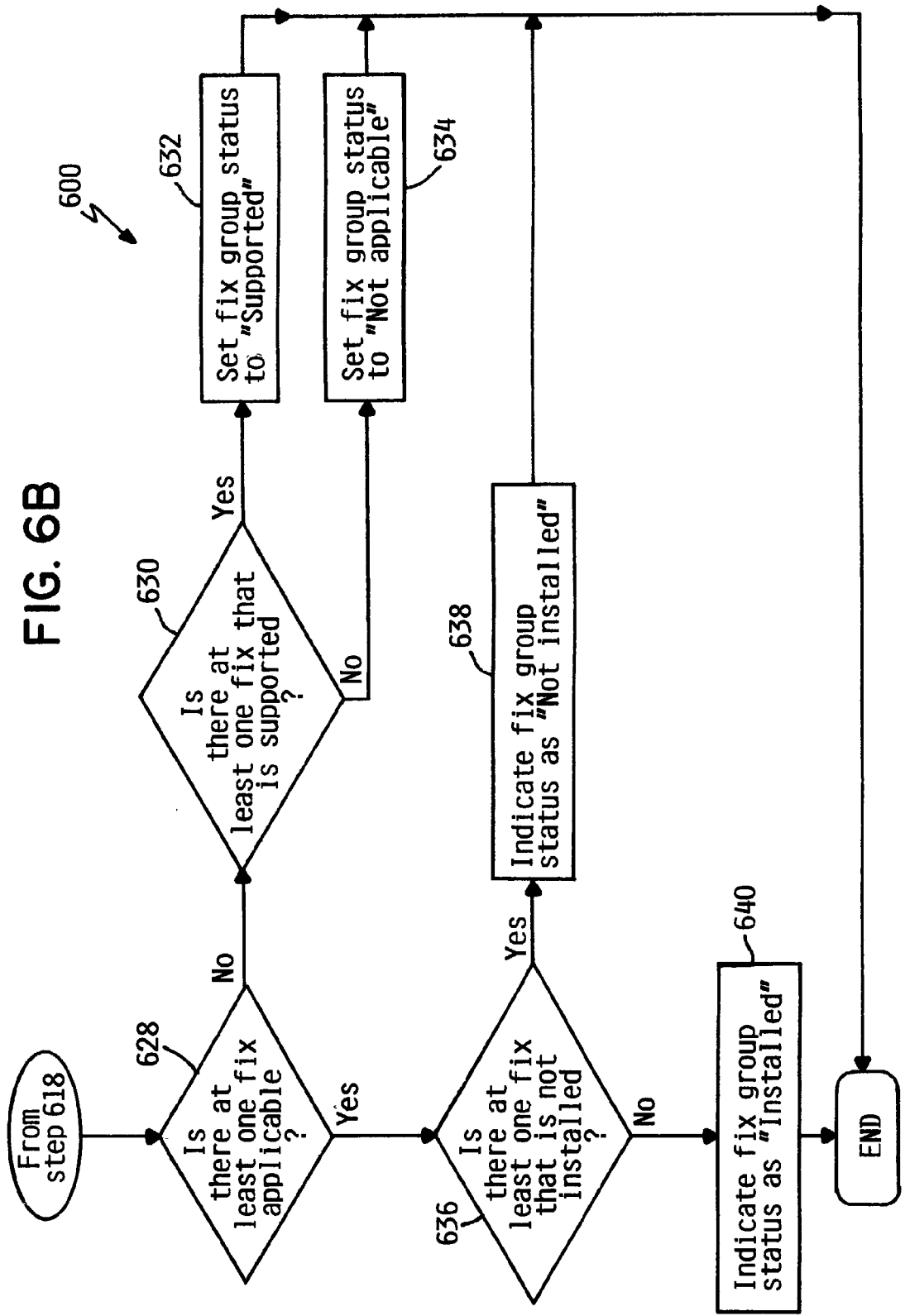

Referring now to FIGS. 6A and 6B, a process 600 of determining the status of a fix group, e.g., fix group 300 at level 10, in accordance with an embodiment of the present invention is illustrated. In one embodiment, the process 600 is performed by the software fix group inventory manager 120. In another embodiment, the status of the fix group is determined by first determining the status of all the fixes as identified by the fix records in the fix group, including those identified by the related fix group list. At step 602, a fix record, e.g., fix record 302 is fetched from a fix list, e.g., fix list 340. Using the information contained in the fix record, a determination is made as to whether the software product identifier and the software product release (e.g., Prod 1 at release 9.0) contained within the fix record indicates that the software product is installed in the computer 110 (step 604). In one embodiment, the determination is made by determining whether the software product identifier and the release are found in the software product inventory 124, and whether the software product status is "installed" (e.g., fix record 502 in software product inventory 124 shown in FIG. 5). If so, then it is determined that the software product is installed in the computer system. If it is determined that the software product is installed in the computer system, processing continues to step 608.

At step 608, a temporary flag indicating that the fix identified by fix record 302 is applicable is set. In one embodiment, the flag is set only if the flag has not been previously set. At step 610, a determination is made as to whether the fix identified by fix record 302 is installed in the computer 110. In one embodiment, the determination is made by determining whether the fix identifier Fix_ID_1 for the particular software product s/w Prod 1 at release 9.0 contained within fix record 302 is identified (or listed) in the software fix inventory 126. If the answer is in the negative, then the status for the fix identified by fix record 302 is set to "not installed" (step 614). In one embodiment, the fix status "not installed" indicates that the fix identified by fix record 302 is not installed. If the answer is in the affirmative, a determination is made as to whether all the fix records (e.g., fix records 302, 304, 306 and 308) contained within the fix list have been processed (step 616). If not, processing returns to step 602 at which the next fix record (e.g., fix record 304) in the fix list is fetched. Steps 602-616, therefore, are configured to continue until all the fix records within a fix list of a fix group have been processed.

At step 618, a determination is made as to whether all the fix records in the related fix group (e.g., Fix_Grp_X in FIG. 4) identified in the fix group have been processed. If not, then a determination is made as to whether the related fix group identified in the fix group are in the computer system (step 620). In one embodiment, the determination is made by determining whether the related fix group is listed in a fix group inventory, such as the fix group inventory 130. If so, then processing continues to step 602 at which a fix record is fetched from the related fix group. Steps 602-618 are repeated until all the fix records in all of the related fix groups are processed.

Referring back to step 604 (at which a determination is made as to whether the software product identifier and the software product release contained within the fix record indicates that the software product is installed in the computer system), if the answer is in the negative, then a determination is made as to whether the software product identifier and release contained within the fix record indicates that the software product is supported by the computer system (step 606). In one embodiment, the determination is made by determining whether the software product identifier and the release from the fix list are found in the software product inventory and whether the product status is "supported" (e.g., product record 506 of software product inventory 124 shown in FIG. 5). If the software product is determined as not being supported by the computer system, then processing then continues to step 616. However, if the software product is determined as supported by the computer system, then a temporary flag indicating that the fix identified by the fix record is "supported" is set (step 612). Processing then continues to step 616.

Referring back to step 610 (at which a determination is made as to whether the fix identified by the fix record is installed in the computer system), if the answer is in the negative, then another temporary flag, which indicates that the fix identified by the fix record is not installed, is set (step 614). Referring back to step 620 (at which a determination is made as to whether the related fix group identified in the fix group is in the computer system), if the answer is in the negative, then the status for the fix group is set to "unknown" (step 622). In one embodiment, the status "unknown" indicates that the status cannot be resolved because the one or more related fix groups cannot be identified in the system, e.g., the related fixed groups are not listed in the fix group inventory 130.

Referring back to step 618 (at which a determination is made as to whether all of the related fix groups have been processed), if the answer is in the affirmative, then a determination is made as to whether the fix group contains at least one fix record identifying a fix that has been indicated as applicable by a temporary flag (step 628). In one embodiment, the determination is made by determining whether the flag (at step 608) was set to "applicable" at least once. If so, then a determination is made as to whether the fix group contains at least one fix record identifying a fix that has been indicated as supported by a temporary flag (step 630). If not, then the status for the fix group is set to "not applicable" (step 634). In one embodiment, the status "not applicable" indicates that all the fixes identified by the fix records in the fix group are configured for products that are not installed in the system, i.e., the fix group is not applicable to the system. If the answer to the inquiry at step 630 is in the affirmative, then the status for the fix group is set to "supported" (step 632). In one embodiment, the status "supported" indicates that the fix group has no fix records for fixes configured to update the software products installed in the system, but the fix group does have at least one fix record for a product that is supported in the system.

Referring back to step 628 (at which a determination is made as to whether the fix group contains at least one fix record identifying a fix that has been indicated as applicable by a temporary flag), if the answer is in the affirmative, then a determination is made as to whether the fix group contains at least one fix record for a fix that that has been indicated as not installed by a temporary flag is (step 636). If the answer to the inquiry at step 636 is in the affirmative, then the status for the fix group is set to "not installed" (step 638). In one embodiment, the status "not installed" indicates that at least one fix identified by a fix record in the fix group is not installed in the system. If the answer is in the negative, then the status for the fix group is set to "installed" (step 640). In one embodiment, the status "installed" indicates that all the fixes identified by the fix records in the fix group are installed in the computer system.

Applying the process 600 to fix group 300 at level 10 (shown in FIG. 3) would generate a status of "installed" for fix group 300. In particular, the software products (i.e., Prod 1 at release 9.0 and Prod 2 at release 2.0) identified by the first three fix records (i.e., 302, 304 and 306) in the fix list 340 of fix group 300 are listed in the software product inventory 124 as being installed in the system. Furthermore, the fixes identified by those fix records are listed the software fix inventory 126 as being installed. The software product (i.e., Prod 2 at release 2.1.1) identified by the last fix record (i.e., 308) in fix list 340 is not listed in the software product inventory 124 as either installed or supported in the system. Furthermore, the fix (having the name Fix_ID_4) identified by fix record 308 is not listed in software fix inventory 126. Applying the process 600 to fix group 300 at level 10 would therefore yield a status of "installed" for fix group 300.

In accordance with an embodiment of the present invention, the status of a fix group changes when either the information contained in the software product inventory or the software fix inventory changes. For example, if the fix identified by Fix_ID_1 were uninstalled, then the fix status associated with Fix_ID_1 is changed to "not installed" in software fix inventory 126 (see FIG. 5). Therefore, the status of fix group 300 would be changed to "not installed" since all the fixes identified in fix group 300 are now not installed. Similarly, if the software product identified in fix record 308 (i.e., Prod 2 at release 2.1.1) were installed in the system, a product record identifying Prod 2 at release 2.1.1. would be added to software product inventory 124. However, since the fix for Prod 2 at release 2.1.1, as identified by fix record 308 with the name Fix_ID_4, is not installed in software fix inventory 126, the status for fix group 300 would now be changed to "not installed" as well. In another embodiment, the status for the fix group also changes when the level of the related fix group changes.

Figure 7A:
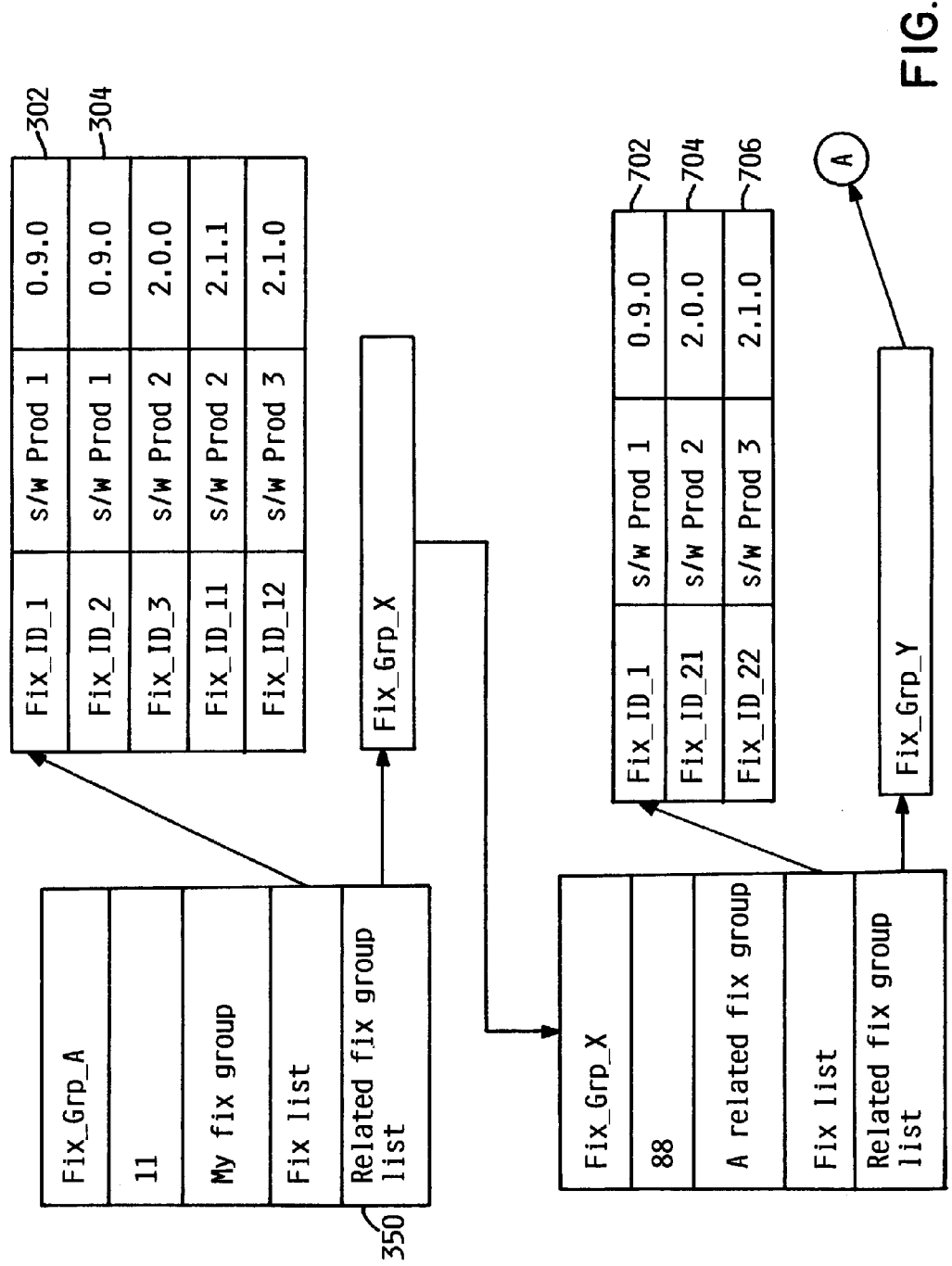
FIG. 7 is a block diagram of a fix group with all its related fix group lists in accordance with an embodiment of the invention.
Figure 7B:
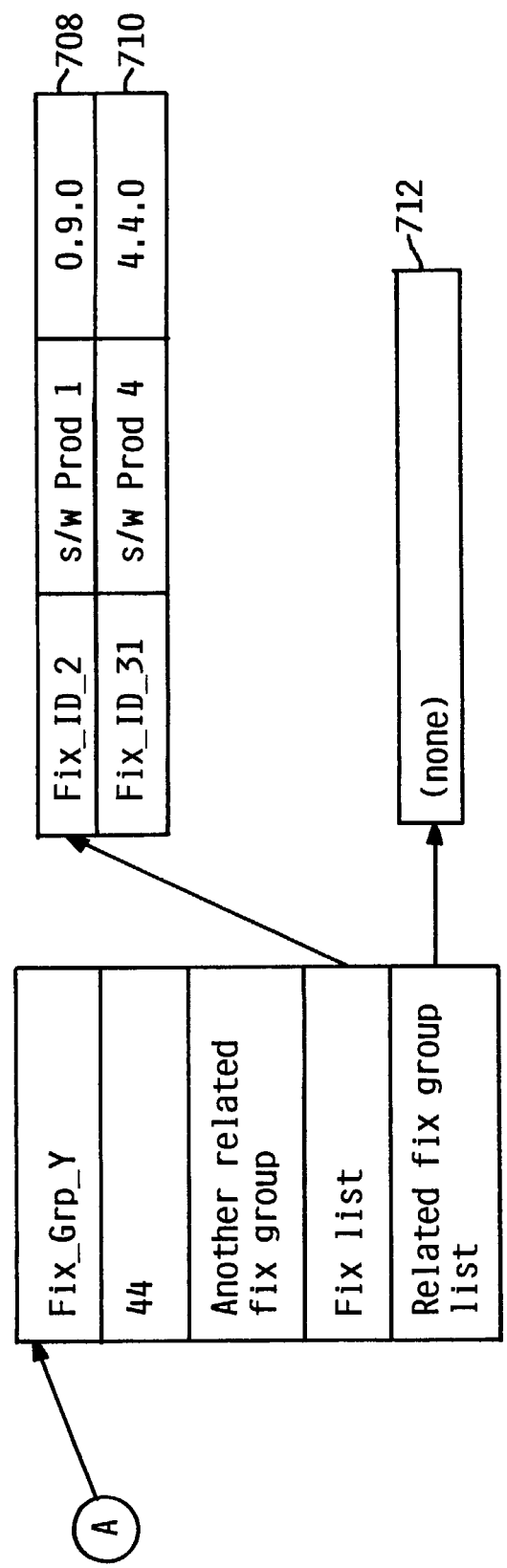

Referring now to FIG. 7, a block diagram of fix group 300 at level 11 (shown in FIG. 4) with all its related fix group lists are illustrated in accordance with an embodiment of the invention. As shown in FIG. 7, related fix group fix list 350 with the name Fix_Grp_X has fix records 702, 704 and 706. Fix record 702 comprises a fix identifier Fix_ID_1, a software product identifier Prod 1 and a software release 9.0. Fix record 704 comprises a fix identifier Fix_ID_21, a software product identifier Prod 2 and a software release 2.0.0. Fix record 706 comprises a fix identifier Fix_ID_22, a software product identifier Prod 3 and a software release 2.1.0. Related fix group 350 also has a related fix group list Fix_Grp_Y. Related fix group Fix_Grp_Y has fix records 708 and 710. Fix record 708 comprises a fix identifier Fix_ID__2, a software product identifier Prod 1 and a software release 9.0. Fix record 710 comprises a fix identifier Fix_ID__31, a software product identifier Prod 4 and a software release 4.4.0. Related fix group Fix_Grp_Y, however, has no related fix groups (see 712).

Applying the process 600 to fix group 300 at level 11 (shown in FIG. 7) would yield a status of "not installed" for fix group 300. In this embodiment, the status of fix group 300 is "not installed" because one fix identified by a fix record in fix group 300 is not installed in the system 110. More specifically, the fix identified by Fix_ID__21 in related fix group list Fix_Grp_X is not installed in the system 110, i.e., Fix_ID__12 is not listed in software fix inventory 126.

The status of each fix identified in fix group 300 at level 11 may be stored in an expanded fix list 800, as shown in FIG. 8A. The expanded fix list 800 contains all the fix records in fix group 300 at level 11 and in all its related fix group lists, i.e., related fix group list Fix_Grp_X and Fix_Grp_Y. In one embodiment, any duplicate fix records (e.g., fix records 304 and 708) are removed from the expanded fix list 800.

The status for each fix group in fix group 300 at level 11 may also be stored in a fix group inventory 900 shown in FIG. 8B. The fix group inventory 900 specifically indicates that the status for fix group Fix_Grp_A at level 11 is not installed. The status for related fix group Fix_Grp_X is not installed, while the status for related fix group Fix_Grp_Y is installed. The status for related fix group Fix_Grp_X is not installed because the fix identified by Fix_ID__21 in related fix group list Fix_Grp_X is not installed in the system 110. Since the status for related fix group Fix_Grp_X is "not installed," the status for entire fix group, i.e., fix group 300 at level 11, is also "not installed." In one embodiment, the fix group inventory 900 may be displayed in a graphical user interface, such as the graphical user interface 950 in FIG. 9.

Figure 11:
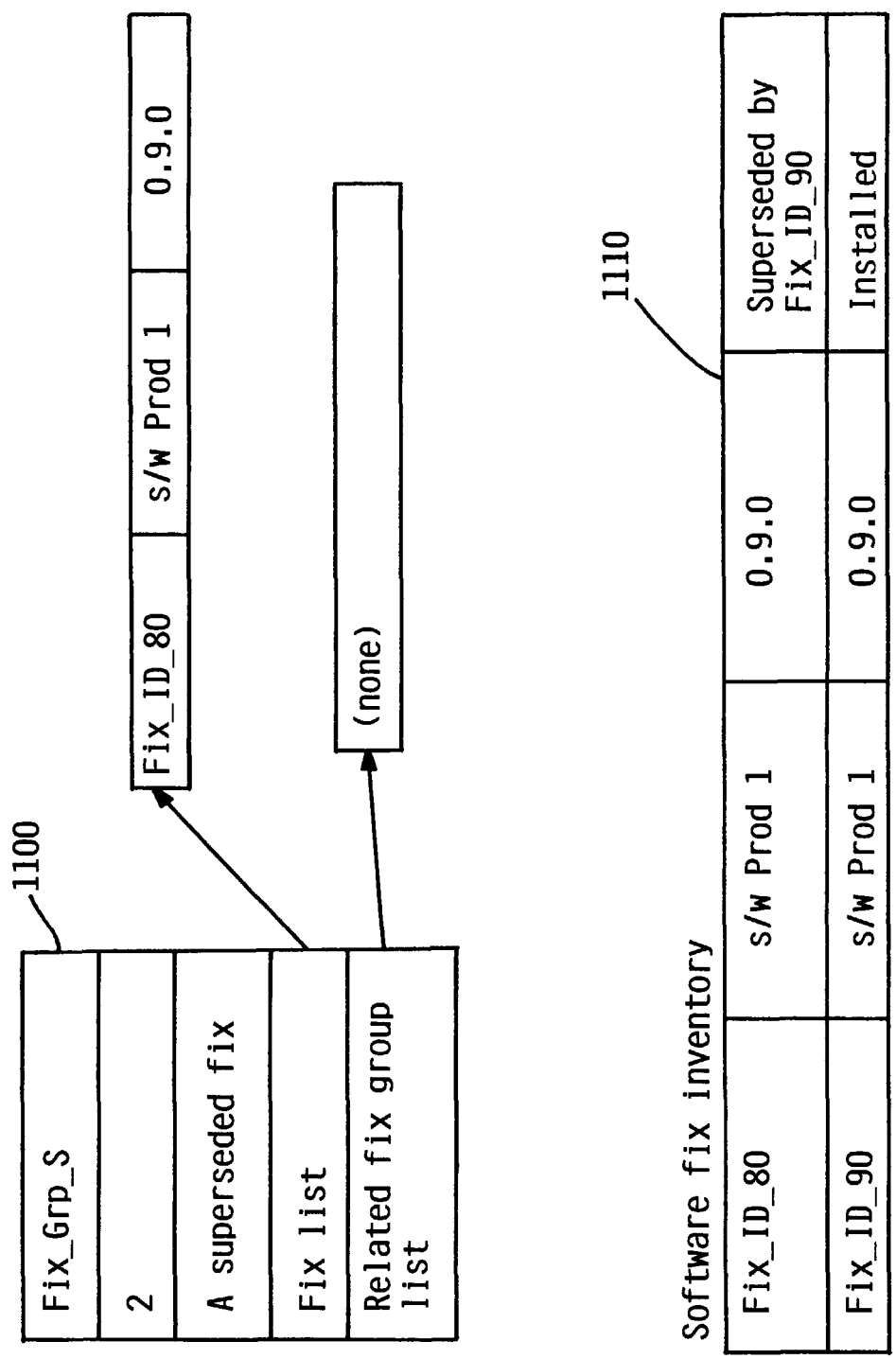
FIG. 11 illustrates a block diagram of a fix group having a name Fix_Grp_S in accordance with an embodiment of the invention.

Referring now to FIG. 11, a fix group 1100 having a name Fix_Grp_S in accordance with an embodiment of the invention is shown. The fix identified by fix identifier Fix_ID__80 is a superseded fix. That is, the fix identified by fix identifier Fix_ID__80 has been superseded by superseding fix, i.e., the fix identified by fix identifier Fix_ID__90 shown in software fix inventory 1110. A superseding fix generally contains both fixes, e.g., the fix identified by fix identifier Fix_ID__80 and the fix identified by fix identifier Fix_ID__90. In one embodiment, the fix identified by Fix_ID__80 is indicated by a status of "superseded by Fix_ID__90" in software fix inventory 1110. In accordance with an embodiment of the invention, the status of the superseding fix, i.e., Fix_ID__90, determines the status of the superseded fix, i.e., Fix_ID__80, which in turn determines the status of fix group 1100. Applying process 600 to fix group 1100 therefore would generate a status of "installed," because the status of the fix identified by Fix_ID__90 is "installed." In accordance with another embodiment of the invention, the status of the superseding fix may be displayed as the status of the superseded fix.

Figure 12:
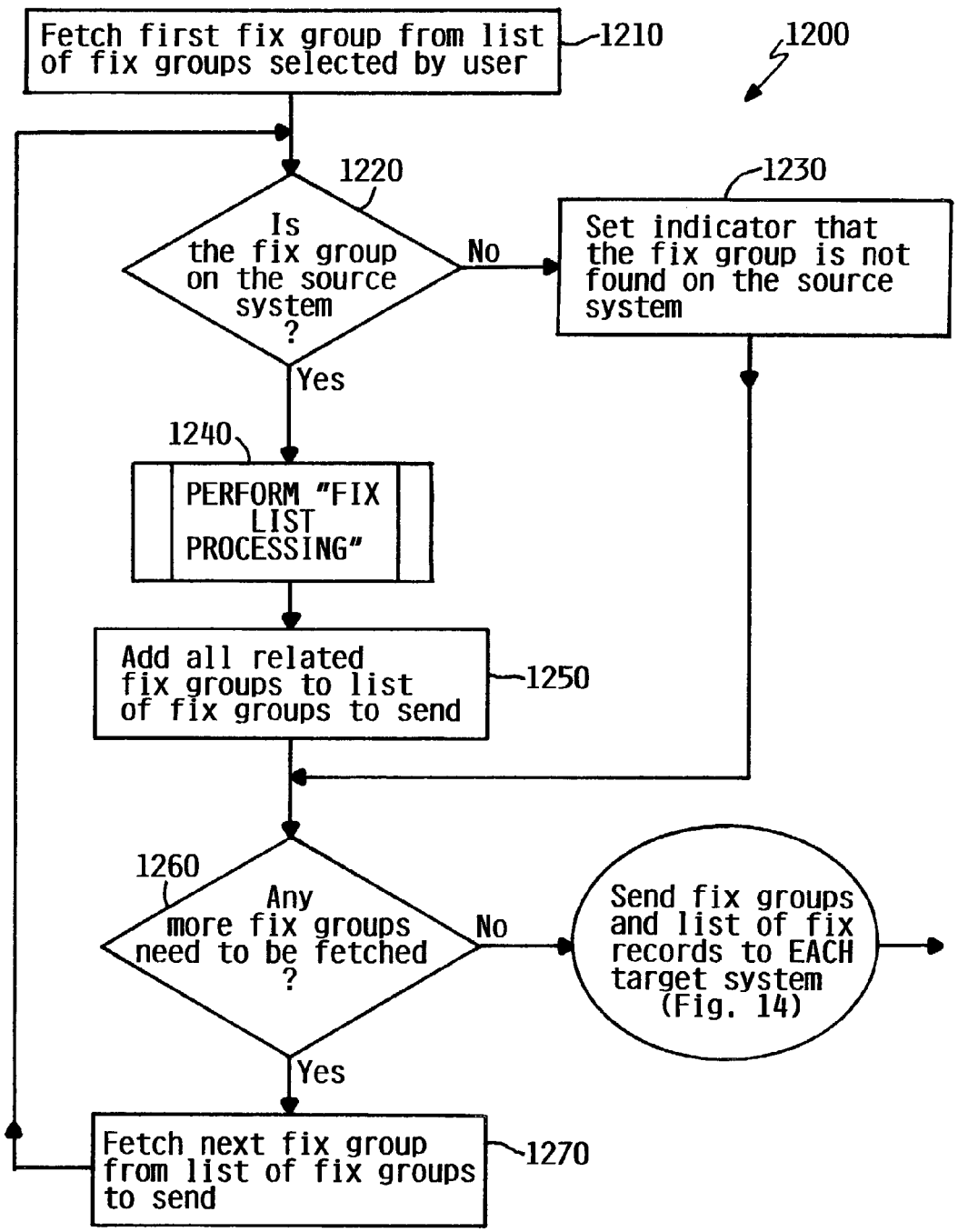
FIG. 12 is a method of sending and installing one or more fix groups in accordance with an embodiment of the invention.

Several actions can be performed on a fix group, including installing the fix group on a system, uninstalling the fix group, sending the fix group, copying the fix group or cleaning up the fix group. FIG. 12 illustrates a method 1200, by a source system, of sending and installing one or more fix groups in accordance with an embodiment of the invention. At step 1210, upon receiving a request to send a list of fix groups, a fix group is fetched from the list of fix groups. At step 1220, a determination is made as to whether the fix group is stored in the source system. If not, an indicator indicating that the fix group is not stored in the system is set (step 1230). If the answer is in the affirmative, the fix list of the fix group is processed (step 1240).

Figure 13:
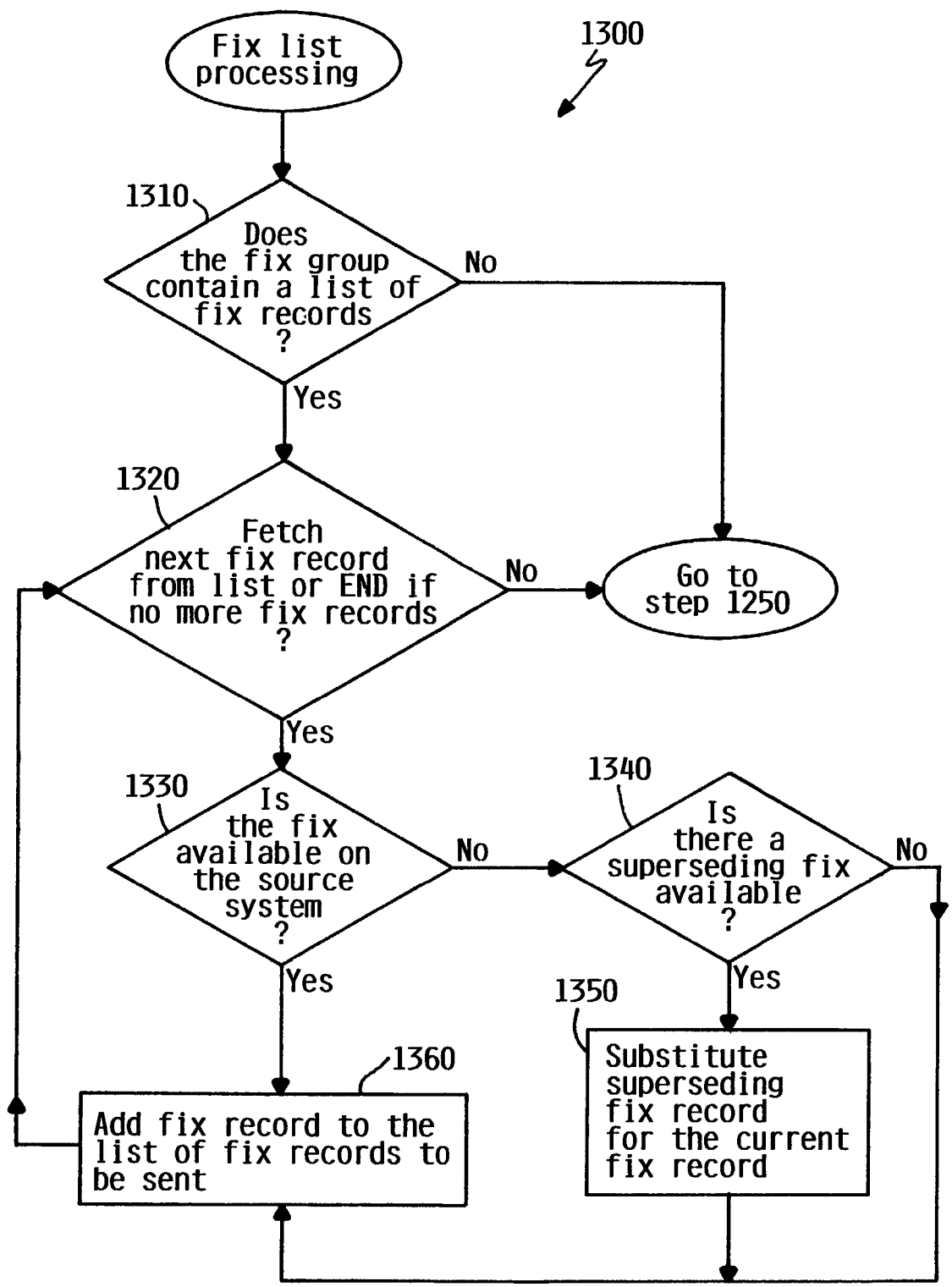
FIG. 13 is a method of processing a fix list in accordance with an embodiment of the invention.

Referring now to FIG. 13, a method of processing a fix list in accordance with an embodiment of the invention is illustrated. At step 1310, a determination is made as to whether the fix list contains one or more fix records. If not, processing continues to step 1250 in FIG. 12. Otherwise, a determination is made as to whether the fix list contains any more fix records that need to be processed (step 1320). If so, a fix record is fetched from the fix list and a determination is made as to whether the fix identified by the fix record is available in the system (step 1330). In one embodiment, the determination is made by determining whether the fix record is listed in the software fix inventory of the system. If so, then the fix record is added to a list of fix records to be sent (step 1360). Processing then returns to step 1320 at which the next fix record is fetched from the fix list. If not, then a determination is made as to whether a fix superseding (i.e., a superseding fix) the fix identified by the fix record is available (step 1340). If not, processing continues to step 1360. If so, the superseding fix is substituted for the fix (step 1350). Processing continues to step 1360.

Referring back to FIG. 12, following step 1240, all the related fix groups identified in the fix group are determined and added to the list of fix groups (step 1250). At step 1260, a determination is made as to whether any more fix groups need to be fetched. If so, the next fix group is fetched from the list of fix groups (step 1270). In one embodiment, if a related fix group is added to the list of fix groups at step 1250, then the answer to the inquiry at step 1260 will be in the affirmative. Processing then returns to step 1220. If the answer to the inquiry at step 1260 is in the negative, then the list of fix groups and the list of fix records are sent to a target system. In one embodiment, the list of fix groups and the list of fix records may be sent to more than one target system.

Figure 14:
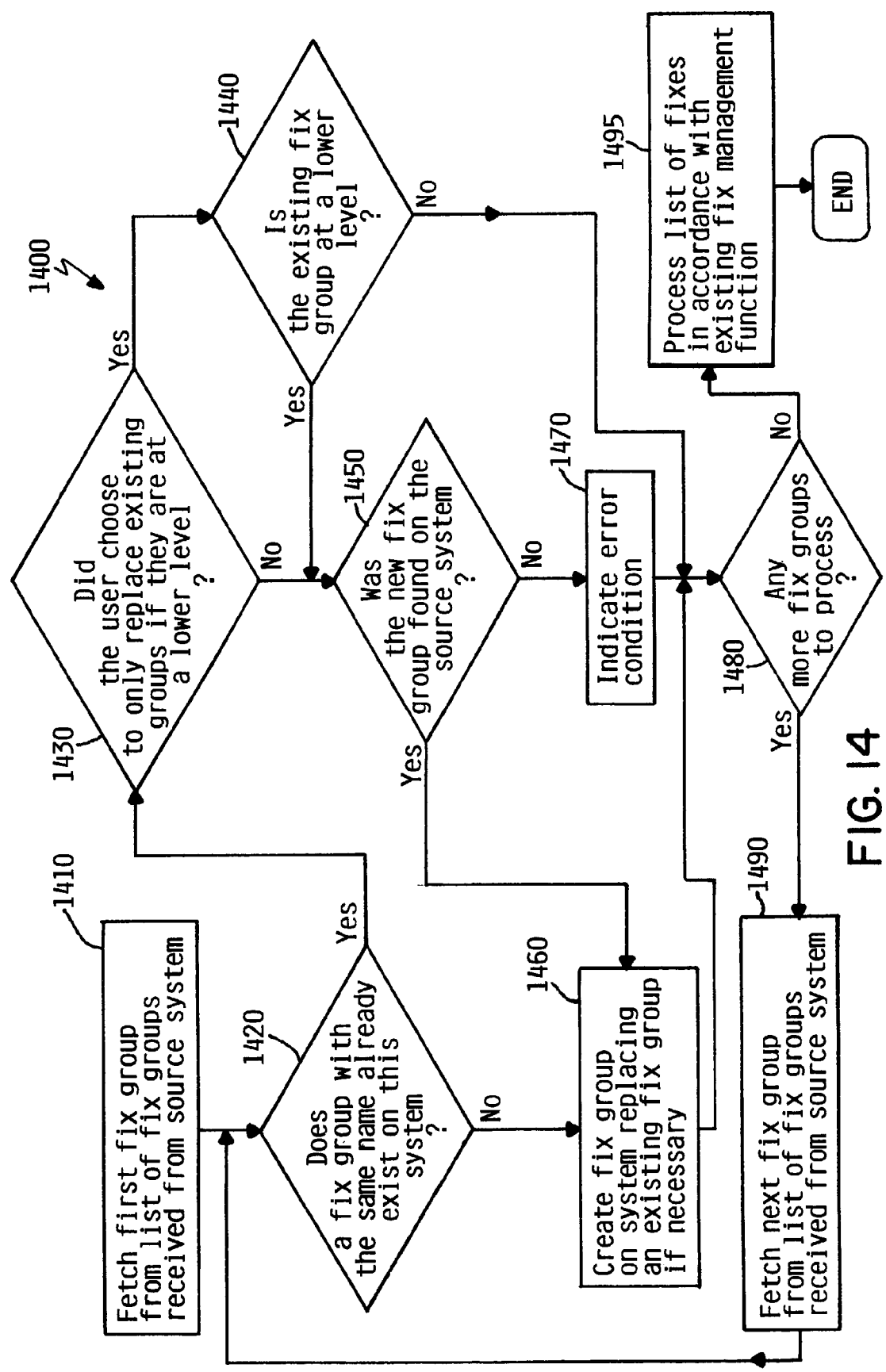
FIG. 14 is a method for processing a list of fix groups and a list of fix records in accordance with an embodiment of the invention.

Referring now to FIG. 14, a method 1400 for processing, by the target system, the list of fix groups and the list of fix records in accordance with an embodiment of the invention is shown. When the list of the fix groups and the list of fix records are received by the target system, a fix group is fetched from the list of fix groups (step 1410). At step 1420, a determination is made as to whether an existing fix group with the same name as the fix group already exists in the target system. If so, a determination is made as to whether the user has indicated to replace the existing fix group only if the level of the existing fix group is lower than that of the fetched fix group (step 1430). If so, a determination is made as to whether the level of the existing fix group is lower than that of the fetched fix group (step 1440). If so, a determination is made as to whether the fetched fix group is stored in the source system (step 1450). If so, the fetched fix group is stored in the target system, replacing the existing fix group, if any (1460). If the answer to the inquiry at step 1430 is in the negative, processing continues to step 1450. If the answer to the inquiry at step 1420 is in the negative, processing also continues to step 1460. If the answer to the inquiry at step 1450 is in the negative, then an error condition is indicated (step 1470). Processing then continues to step 1480.

At step 1480, a determination is made as to whether the list of fix groups contains any more fix groups to be processed (step 1480). If so, the next fix group is fetched from the list of fix groups (step 1490) and processing then returns to step 1410. If not, then the fixes identified by the fix groups are installed to the target system in accordance with existing fix management function (step 1495). In this manner, the target system is provided with a method 400 that retrieves only the fixes that it needs, thus reducing transmission time of the fixes.

One embodiment of the invention is implemented as a program product for use with a computer system such as, for example, the computer 110 shown in FIG. 1 and described above. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to embodiments of the present invention, other and further embodiments of the invention may be devised without departing from the basic scope thereof, and the scope thereof is determined by the claims that follow.

What is claimed is:

1. A computer-implemented method of software product fix management in a computer system, the method comprising:
   providing a first data structure including a plurality of fix records, each fix record representing a respective fix of a plurality of fixes collectively pertaining to one or more corresponding software products, the first data structure not including any of the plurality of fixes, the first data structure including a group level comprising a version attribute pertaining to the plurality of fixes as a whole, wherein a more recent version of the plurality of fixes is represented by a higher value of the group level, wherein the plurality of fix records are used as a basis to discover whether the one or more corresponding software products are installed on the computer system;
   providing a conditional replacement flag set based on received input;
   upon determining, based on the group level, that the first data structure represents a more recent version of the plurality of fixes than a second data structure previously provided on the computer system, replacing the second data structure with the first data structure, wherein the first data structure is processed in lieu of the second data structure; and
   upon determining, based on the group level, that the first data structure represents a less recent version of the plurality of fixes than the second data structure on the computer system:
      if the conditional replacement flag is false, replacing the second data structure with the first data structure despite the first data structure representing the less recent version, wherein the first data structure is processed in lieu of the second data structure;
      wherein if the conditional replacement flag is true, the second data structure is not replaced with the first data structure, and the second data structure is processed in lieu of the first data structure.

2. The computer-implemented method of claim 1, wherein the one or more corresponding software products consist of a single corresponding software product, and wherein the method further comprises, if the single corresponding software product is not installed, then setting the group status to a third value reflecting that the plurality of fixes is not applicable to the computer system.

3. The computer-implemented method of claim 1, wherein determining whether each of the plurality of fixes is installed in the computer system comprises accessing the first data structure, which identifies each of the plurality of fixes.

4. The computer-implemented method of claim 1, further comprising, if the corresponding software product is not installed and at least one of the plurality of fixes is stored on the computer system, then setting the status value to reflect that the at least one of the plurality of fixes is stored on the computer.

5. The computer-implemented method of claim 1, wherein determining whether each of the plurality of fixes is installed in the computer system comprises determining whether each of the plurality of fixes is identified in a fix inventory of the computer system.

6. The computer-implemented method of claim 1, wherein each value is distinct;
   wherein the plurality of fixes collectively pertain to a plurality of corresponding software products including the one or more corresponding software products, at least one of the corresponding software products having more than one fix in the plurality of fixes;
   wherein at least one software product installed on the computer system is not discovered, due to the plurality of fixes not containing any fix pertaining to the at least one software product;
   wherein the first data structure includes a group status indicating whether the plurality of fixes is installed, wherein the method further comprises
   if the corresponding software product is installed, then determining whether the respective fix is installed in the computer system;
   if each of the plurality of fixes is installed, then setting the group status to a first value reflecting that the plurality of fixes is installed; and
   if any one of the plurality of fixes is not installed, then setting the group status to a second value reflecting that the plurality of fixes is not completely installed.

7. The computer-implemented method of claim 6, wherein the first data structure further includes a group name uniquely identifying the plurality of fixes relative to other pluralities of fixes.

8. The computer-implemented method of claim 7, wherein each fix record includes:

(i) a fix name uniquely identifying the fix relative to other fixes;

(ii) a software product name uniquely identifying the software product relative to other software products, wherein the identified fix pertains to the identified software product;

(iii) a release number pertaining to the software product name; and (iv) a fix status indicating whether the fix represented by the respective fix record is installed.

9. The computer-implemented method of claim 8, wherein the group status is set without first requiring any of the plurality of fixes to be downloaded, and wherein the method further comprises:

setting the respective fix status of each fix record to indicate whether the fix represented by the respective fix record is installed; and determining which of the plurality of fixes to download, based at least in part on the group status, such that any fix already installed is not downloaded.

10. The computer-implemented method of claim 9, wherein determining which of the plurality of fixes to download comprises:

if the group status reflects that the plurality of fixes is not completely installed, determining to download a first fix of the plurality of fixes, based on the fix status of the fix record representing the first fix; and if the group status reflects that the plurality of fixes is installed, determining not to download any of the plurality of fixes, without evaluating any fix status of the plurality of fix records.

11. The computer-implemented method of claim 10, wherein the method further comprises:

determining, for each of the plurality of fixes to download, whether a superseding fix is available for the respective fix, without requiring any user input specifying to determine whether any superseding fix is available; and upon determining that the superseding fix is available for the respective fix, downloading the superseding fix in lieu of the respective fix, without requiring any user input specifying to download the superseding fix.

12. The computer-implemented method of claim 11, wherein the group status value is set by a fix management application, wherein the received input comprises user input, wherein the first data structure further specifies a plurality of related fix groups, each fix group comprising a plurality of fix records and having a distinct group name, and wherein the fix management application is configured to:

process each of the plurality of related fix groups without requiring user input specifying to process any of the plurality of related fix groups.

13. The computer-implemented method of claim 12, wherein the fix management application is further configured to determine and set each fix record fix status selected from:

(i) a first value indicating that a fix is installed on the computer system;

(ii) a second value indicating that the fix is not installed on the computer system;

(iii) a third value indicating that the fix is not applicable to the computer system; and (iv) a fourth value indicating that the fix is supported by the computer system.

14. The computer-implemented method of claim 13, wherein the fix management application is further configured to determine and set each group status selected from:

(i) a first value indicating that a group is installed on the computer system;

(ii) a second value indicating that the group is not completely installed on the computer system;

(iii) a third value indicating that the group is entirely not applicable to the computer system;

(iv) a fourth value indicating that the group is at least partially supported by the computer system; and (v) a fifth value indicating that at least one related fix group is not found on the computer system.

15. A computer-implemented method of sending, from a computer system, a first data structure identifying a plurality of fixes pertaining to one or more corresponding software products, the method comprising:

receiving, from a requesting entity, a request to send the first data structure, the first data structure not including any of the plurality of fixes, the first data structure including a group level comprising a version attribute pertaining to the plurality of fixes as a whole, wherein a more recent version of the plurality of fixes is represented by a higher value of the group level;

if the plurality of fixes has a related plurality of fixes, then retrieving an additional data structure identifying the related plurality of fixes; and sending, to the requesting entity, the first data structure identifying the plurality of fixes and the additional data structure identifying the related plurality of fixes, wherein the requesting entity is configured to:

(i) use a selected data structure, comprising at least one of the first data structure and the additional data structure, as a basis to discover whether the one or more corresponding software products are installed on the requesting entity;

(ii) provide a conditional replacement flag set based on received input;

(iii) upon determining, based on the group level, that the selected data structure represents a more recent version of the plurality of fixes than a second data structure previously received by the requesting entity, replace the second data structure with the selected data structure, wherein the selected data structure is processed in lieu of the second data structure; and (iv) upon determining, based on the group level, that the selected data structure represents a less recent version of the plurality of fixes than the second data structure on the requesting entity:

if the conditional replacement flag is false, replace the second data structure with the selected data structure despite the selected data structure representing the less recent version, wherein the selected data structure is processed in lieu of the second data structure;

wherein if the conditional replacement flag is true, the second data structure is not replaced with the selected data structure, and the second data structure is processed in lieu of the selected data structure.

16. A computer readable storage medium containing a program which, when executed, performs an operation of software product fix management in a computer system, the operation comprising:

providing a first data structure including a plurality of fix records, each fix record representing a respective fix of a plurality of fixes collectively pertaining to one or more corresponding software products the first data structure not including any of the plurality of fixes, the first data structure including a group level comprising a version attribute pertaining to the plurality of fixes as a whole, wherein a more recent version of the plurality of fixes is represented by a higher value of the group level, wherein the plurality of fix records are used as a basis to discover whether the one or more corresponding software products are installed on the computer system;

providing a conditional replacement flag set based on received input;

upon determining, based on the group level, that the first data structure represents a more recent version of the plurality of fixes than a second data structure previously provided on the computer system, replacing the second data structure with the first data structure, wherein the first data structure is processed in lieu of the second data structure; and upon determining, based on the group level, that the first data structure represents a less recent version of the plurality of fixes than the second data structure on the computer system:

if the conditional replacement flag is false, replacing the second data structure with the first data structure despite the first data structure representing the less recent version, wherein the first data structure is processed in lieu of the second data structure;

wherein if the conditional replacement flag is true, the second data structure is not replaced with the first data structure, and the second data structure is processed in lieu of the first data structure.

17. The computer readable storage medium of claim 16, wherein the one or more corresponding software products consist of a single corresponding software product, and wherein the method further comprises, if the single corresponding software product is not installed, then setting the group status to a value reflecting that the plurality of fixes is not applicable to the computer system.

18. The computer readable storage medium of claim 16, wherein determining whether each of the plurality of fixes is installed in the computer system comprises accessing the first data structure, which identifies each of the plurality of fixes.

19. The computer readable storage medium of claim 16, further comprising, if the corresponding software product is not installed and at least one of the plurality of fixes is stored on the computer system, then setting the status value to reflect that the at least one of the plurality of fixes is stored on the computer.

20. The computer readable storage medium of claim 16, wherein determining whether each of the plurality of fixes is installed in the computer system comprises determining whether each of the plurality of fixes is identified in a fix inventory of the computer system.

21. A computer readable storage medium containing a program which, when executed, performs an operation of sending, from a computer system, a first data structure identifying a plurality of fixes pertaining to one or more corresponding software products, the operation comprising:

receiving, from a requesting entity, a request to send the first data structure, the first data structure not including any of the plurality of fixes, the first data structure including a group level comprising a version attribute pertaining to the plurality of fixes as a whole, wherein a more recent version of the plurality of fixes is represented by a higher value of the group level;

if the plurality of fixes has a related plurality of fixes, then retrieving an additional data structure identifying the related plurality of fixes; and sending, to the requesting entity, the first data structure identifying the plurality of fixes and the additional data structure identifying the related plurality of fixes, wherein the requesting entity is configured to:

(i) use a selected data structure, comprising at least one of the first data structure and the additional data structure, as a basis to discover whether the one or more corresponding software products are installed on the requesting entity;

(ii) provide a conditional replacement flag set based on received input;

(iii) upon determining, based on the group level, that the selected data structure represents a more recent version of the plurality of fixes than a second data structure previously received by the requesting entity, replace the second data structure with the selected data structure, wherein the selected data structure is processed in lieu of the second data structure; and (iv) upon determining, based on the group level, that the selected data structure represents a less recent version of the plurality of fixes than the second data structure on the requesting entity:

if the conditional replacement flag is false, replace the second data structure with the selected data structure despite the selected data structure representing the less recent version, wherein the selected data structure is processed in lieu of the second data structure;

wherein if the conditional replacement flag is true, the second data structure is not replaced with the selected data structure, and the second data structure is processed in lieu of the selected data structure.

22. A data structure stored in a memory, the data structure comprising:

a first plurality of fix records representing a first plurality of fixes collectively pertaining to one or more corresponding software products, each fix record comprising a software product identifier, a software fix identifier and a software product release identifier, the first data structure including a group level comprising a version attribute pertaining to the plurality of fixes as a whole, wherein a more recent version of the plurality of fixes is represented by a higher value of the group level, wherein the first plurality of fix records is used as a basis to discover whether the one or more corresponding software products are installed; and a reference to a second plurality of fix records representing a second plurality of fixes related to the first plurality of fixes collectively pertaining to the one or more corresponding software products;

wherein the data structure has an associated conditional replacement flag set based on received input, wherein upon determining, based on the group level, that the first data structure represents a more recent version of the plurality of fixes than a second data structure stored on a requesting entity, the second data structure on the requesting entity is replaced with the first data structure, wherein the first data structure is processed on the requesting entity in lieu of the second data structure; and wherein upon determining, based on the group level, that the first data structure represents a less recent version of the plurality of fixes than the second data structure on the computer system:

if the conditional replacement flag is false, the second data structure on the requesting entity is replaced with the first data structure despite the first data structure representing the less recent version, wherein the first data structure is processed on the requesting entity in lieu of the second data structure;

wherein if the conditional replacement flag is true, the second data structure on the requesting entity is not replaced with the first data structure, and the second data structure is processed on the requesting entity in lieu of the first data structure.

23. The data structure of claim 22, wherein each fix record further comprises a fix group level.

24. A computer system for software product fix management, the computer system comprising:
  a memory containing a program; and
  a processor which, when executing the program, performs an operation comprising:
    providing a first data structure including a plurality of fix records, each fix record representing a respective fix of a plurality of fixes collectively pertaining to one or more corresponding software products, the first data structure not including any of the plurality of fixes, the first data structure including a group level comprising a version attribute pertaining to the plurality of fixes as a whole, wherein a more recent version of the plurality of fixes is represented by a higher value of the group level, wherein the plurality of fix records are used as a basis to discover whether the one or more corresponding software products are installed on the computer system;
    providing a conditional replacement flag set based on received input;
    upon determining, based on the group level, that the first data structure represents a more recent version of the plurality of fixes than a second data structure previously provided on the computer system, replacing the second data structure with the first data structure, wherein the first data structure is processed in lieu of the second data structure; and
    upon determining, based on the group level, that the first data structure represents a less recent version of the plurality of fixes than the second data structure on the computer system:
      if the conditional replacement flag is false, replacing the second data structure with the first data structure despite the first data structure representing the less recent version, wherein the first data structure is processed in lieu of the second data structure;
      wherein if the conditional replacement flag is true, the second data structure is not replaced with the first data structure, and the second data structure is processed in lieu of the first data structure.

25. A computer system for software product fix to send a first data structure identifying a plurality of fixes pertaining to one or more corresponding software products, the computer system comprising:
  a memory containing a program; and
  a processor which, when executing the program, performs an operation comprising:
    receiving, from a requesting entity, a request to send the first data structure, the first data structure not including any of the plurality of fixes, the first data structure including a group level comprising a version attribute pertaining to the plurality of fixes as a whole, wherein a more recent version of the plurality of fixes is represented by a higher value of the group level;
    if the plurality of fixes has a related plurality of fixes, then retrieving an additional data structure identifying the related plurality of fixes; and
    sending, to the requesting entity, the first data structure identifying the plurality of fixes and the additional data structure identifying the related plurality of fixes, wherein the requesting entity is configured to:
      (i) use a selected data structure, comprising at least one of the first data structure and the additional data structure, as a basis to discover whether the one or more corresponding software products are installed on the requesting entity;
      (ii) provide a conditional replacement flag set based on received input;
      (iii) upon determining, based on the group level, that the selected data structure represents a more recent version of the plurality of fixes than a second data structure previously received by the requesting entity, replace the second data structure with the selected data structure, wherein the selected data structure is processed in lieu of the second data structure; and
      (iv) upon determining, based on the group level, that the selected data structure represents a less recent version of the plurality of fixes than the second data structure on the requesting entity:
        if the conditional replacement flag is false, replace the second data structure with the selected data structure despite the selected data structure representing the less recent version, wherein the selected data structure is processed in lieu of the second data structure;
        wherein if the conditional replacement flag is true, the second data structure is not replaced with the selected data structure, and the second data structure is processed in lieu of the selected data structure.

\* \* \* \* \*